United States Patent

Vitalis et al.

[11] 3,856,722
[45] Dec. 24, 1974

[54] NOVEL ALKALI METAL SALTS OF HIGHER ALIPHATIC FATTY ACID ETHANOLAMIDE SULFOSUCCINATE AS FOAMING AGENTS FOR LATICES AND COMPOSITIONS CONTAINING THE SAME

[75] Inventors: Emil Alfred Vitalis, Stamford; Donald John Tracey, Jr., Fairfield, both of Conn.

[73] Assignee: American Cyanamid Company, Stamford, Conn.

[22] Filed: Feb. 12, 1974

[21] Appl. No.: 441,771

Related U.S. Application Data

[63] Continuation-in-part of Ser. Nos. 361,115, May 17, 1973, abandoned, and Ser. No. 436,825, Jan. 25, 1974, abandoned.

[52] U.S. Cl. ........ 260/2.5 L, 260/2.5 P, 260/2.5 FP, 260/42.47, 260/42.49, 260/DIG. 24
[51] Int. Cl. ...... C08d 13/10, C08f 47/10, C08j 1/16
[58] Field of Search ................ 260/2.5 L, 97.5, 401

[56] References Cited
UNITED STATES PATENTS 3,639,298  2/1972  Lister et al. ...................... 260/2.5 L
3,719,614  3/1973  Wright ............................ 260/2.5 L

*Primary Examiner*—Morton Foelak
*Attorney, Agent, or Firm*—Harry H. Kline

[57] ABSTRACT

There is provided ammonium or alkali metal salts of liquid, water-soluble higher, aliphatic fatty acid ethanolamide sulfosuccinate as foaming agents for a variety of latices and latex compositions containing the same. The foaming agents are further characterized as having the formula:

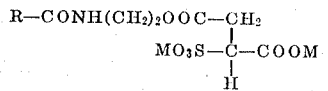

where R is a higher, aliphatic fatty acid moiety, and M is an ammonium, sodium, potassium or lithium cation.

6 Claims, No Drawings

NOVEL ALKALI METAL SALTS OF HIGHER ALIPHATIC FATTY ACID ETHANOLAMIDE SULFOSUCCINATE AS FOAMING AGENTS FOR LATICES AND COMPOSITIONS CONTAINING THE SAME

ABSTRACT OF THE DISCLOSURE

There is provided ammonium or alkali metal salts of liquid, water-soluble higher, aliphatic fatty acid ethanolamide sulfosuccinate as foaming agents for a variety of latices and latex compositions containing the same. The foaming agents are further characterized as having the formula:

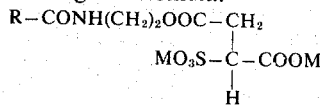

where R is a higher, aliphatic fatty acid moiety, and M is an ammonium, sodium, potassium or lithium cation.

This application is a continuation-in-part of our copending application, Serial No. 361,115 filed on May 17, 1973, now abandoned, and copending application, Serial No. 436,825, filed on January 25, 1974 now abandoned.

The present invention relates to a novel salt of a higher, aliphatic fatty acid ethanolamide sulfosuccinate useful as a foaming agent in a latex composition. More particularly, the invention is directed to a liquid, substantially water-soluble, ammonium or alkali metal salt of a higher, aliphatic fatty acid ethanolamide sulfosuccinate as a foaming agent for styrene-butadiene, styrene-butadiene-carboxylated or polyvinyl chloride rubber latex compositions which, when heat cured, have highly desirable properties as a foamed rubber backing for carpets.

As is well known, foamed rubber backings have been employed to impart a bouncy or soft feel to carpets. Such compositions are generally prepared by admixing sytrene-butadiene resin with a plurality of additives including surfactants or foaming agents. One such agent is Aerosol 18 which is disodium(N-octadecyl)or(tallow amine)sulfosuccinamate. It is substantially water insoluble, paste like and difficult to handle. Unfortunately, the overall styrene-butadiene resin containing as the surfactant, disodium tallow amine sulfosuccinamate, is not entirely satisfactory for the reason that its preparation is difficult to perform, due to the paste like nature of the surfactant and the composition possesses a relatively high foam density requiring large quantities of composition to cover a given area of carpet. With increased use of foamed rubber latex backing for carpets, it would be highly advantageous to provide, if at all possible, a foaming agent and a composition containing the same which possesses a low foam density, requiring the use of lower quantities of composition to cover a given area with resultant savings both to the producer and the consumer.

It is, therefore, a principal object of the invention to provide a novel foaming agent which is in a liquid, easily handleable form. It is further object to provide a latex composition suitable as a foamed rubber backing for carpets possessing a relatively low foam density and stability to allow for substantial cost savings and complete cure without collapse of the backing. Other objects and advantages will be readily ascertained from a reading of the ensuing description.

To this end, it has been surprisingly found that a novel class of foaming agent, namely, the diammonium or dialkali metal salts of a higher, aliphatic ($C_{12}$–$C_{22}$) fatty acid ethanolamide sulfosuccinate when added to latex compositions, markedly improves such compositions, particularly with respect to foam stability and low foam density. Relatively small amounts of the foaming agent are required to enhance latex compositions to an extent hitherto unavailable.

According to the process of the invention, a novel ammonium or alkali metal salt is initially prepared in a plurality of steps by reacting a higher, aliphatic ($C_{12}$–$C_{22}$) fatty acid with ethanolamine in substantially equimolar amounts at an elevated temperature ranging from about 150°C. to about 180°C. for from about 5 to about 10 hours. Resultant fatty acid ethanolamide is next reacted with equimolar amounts of maleic anhydride at temperatures ranging from about 75°C. to 100°C. to prepare fatty acid ethanolamide maleate monoester within 1 to 5 hours and, thereafter, reacting the latter maleate monoester with ammonium or alkali metal sulfite at temperatures ranging from about 45°C. to about 100°C. for from 2 to 8 hours to obtain a liquid, water-soluble, dialkali metal fatty acid ethanolamide sulfosuccinate. The overall reaction may be graphically written as follows:

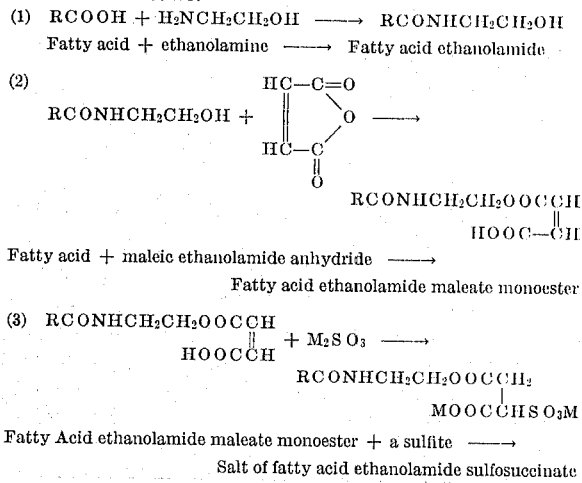

where M is an ammonium radical or an alkali metal, such as sodium, potassium or lithium.

Illustrative of the higher, aliphatic fatty acids which can be used in the process of the invention and which are commercially available are those which contain from 12 to 22 carbon atoms and maybe saturated, monounsaturated or polyunsaturated, such as:

Tall oil fatty acid,
Coconut oil fatty acid,
Corn oil fatty acid,
Palm oil fatty acid,
Sunflower oil fatty acid,
Cottonseed oil fatty acid,
Peanut oil fatty acid,
Safflower oil fatty acid,
Soyabean oil fatty acid, and mixtures of the same. Of the fatty acids specified above, the tall oil fatty acid is preferred.

Advantageously, the aforementioned prepared sulfosuccinate foaming agent enhances latices, such as styrene-butadiene compositions, polyvinyl chloride, and styrene-butadiene carboxylated latices. Styrene-butadiene compositions will be exemplified herein, since such compositions are widely employed as latex backings.

In general, the following formulation in which the parts are by weight is a typical recipe which is used herein to foam styrene-butadiene rubber (SBR) latex:

| Material | Parts |
| --- | --- |
| SBR Latex (68%) | 146.0 |
| Filler (Calcium Carbonate) | 135.0 |
| Hydrated Alumina | 25.0 |
| Disodium Fatty Acid Ethanolamide Sulfosuccinate (35%) | 5.7 |
| Sodium Lauryl Sulfate (30%)* | 5.0 |
| Zinc Diethyl Dithiocarbamate | 1.5 |
| Sodium Hexametaphosphate (5% solution) | 10.0 |
| Zinc Methylene Bis Thiocyanate | 1.0 |
| Water | 15.0 |
| Vulcanizer(2-mercaptobenzothiazole) | 12.0 |
| * Optional | |

The ingredients are mixed together in the above order and whipped in a Hobart mixer. The mixer whips air into the compounded latex which produces a foam cell structure. The foam is then spread or doctored onto the back side of a carpet material, given a 30 second infra-red lamp treatment to put a "skin" on the foam surface, and cured in an oven at 275°F. for 15 minutes.

Unexpectedly, the use of higher, aliphatic fatty acid ethanolamide sulfosuccinate in the above recipe produces a relatively high level of foam which is quite stable. The resultant composition also possesses a low foam density resulting in a substantial weight saving per unit area of carpet. Advantageously, small amounts of the foaming agent, generally between 1.0% and 5.0% and, preferably, between 2.0% and 3.0%, based on the weight of the styrene-butadiene resin, are utilized.

The following examples are presented to illustrate the practice of the invention. These are to be taken merely as illustrative and are not deemed to be limitative. Unless otherwise stated.

EXAMPLE 1

PREPARATION OF DISODIUM TALL OIL FATTY ACID ETHANOLAMIDE SULFOSUCCINATE

To a suitable reaction vessel equipped with stirrer, steam condenser, thermometer, and nitrogen bubbler inlet are added 367.1 parts of tall oil fatty acid and 79.1 parts of monoethanolamine while bubbling nitrogen therethrough. The reaction vessel is heated to 160°C. with the steam condenser operating. Application of steam to the condenser allows the water formed by the reaction to escape, and the amine to condense back into the vessel.

After noting the initial exotherm, the product will gel for a short period until the temperature is approximately 100°C. At this point the gel becomes a fluid, brownish clear liquid.

The acid number will be approximately 150 when the vessel temperature reads 100°C. A rapid drop in acid number occurs at a temperature of 135°C. and higher. It takes approximately 12 hours at 135°C. – 160°C. to reduce the acid number to the desired value of from about 2 to about 3.

The temperature of the reaction vessel is next reduced to 80°C. and there are slowly added 135.0 parts of maleic anhydride. The steam condenser is replaced by a water condenser and the nitrogen flow continued. Heat is applied and the product is stirred until the acid number falls within a range of from 135 to 145. Total reaction time is one and one-half hours. The product is a somewhat viscous dark amber liquid.

The nitrogen flow is shut off and the reaction vessel is maintained at a temperature of 80°C. In a separate vessel, 1,245 parts of water, 11.3 parts of isopropanol, and 180 parts of sodium sulfite are premixed. The resultant solution is clear. The premixed solution is then added to the reaction vessel as rapidly as possible, while maintaining a reaction vessel temperature of at least 55°C. During the solution addition the product changes from a dark amber to a muddy brown liquid. Usually, before all the premixed solution is added, the color of the product changes to a clear golden-brown.

The desired product is characterized as having a 5+ color rating on the Gardner scale, 35% solids, an acid value of 4.0, an iodine value of 0.4 and a viscosity in centipoises of 86 at 25°C.

EXAMPLE 2

Substituting palm oil fatty acid, corn oil fatty acid, linseed oil fatty acid, cottonseed oil fatty acid, sunflower oil fatty acid, coconut oil fatty acid, fatty acids derived from mixed vegetable oils having an acid value of 196–202, an iodine value equal to 90–120, a titer in °C ranging from 18–28 and 3% $C_{14}$ saturated radical as well as 10% $C_{17}$, 8% $C_{18}$ saturated, 40% $C_{18}$ monounsaturated, 25% $C_{18}$ diunsaturated, 6% $C_{18}$ triunsaturated and 8% $C_{22}$ monounsaturated radicals, cottonseed oil-sunflower oil fatty acid mixture, or soyabean oil fatty acid for tall oil fatty acid in the above example, there are obtained the corresponding sodium salts of the fatty acid ethanolamide sulfosuccinates, whose properties are set forth in Table I below.

TABLE I

| Derivative | Appearance | Color[1] | Solids | Acid No. | Iodine Value | Viscosity[2] in cps. |
| --- | --- | --- | --- | --- | --- | --- |
| Palm Oil Fatty Acid | Turbid light Brown Liquid | 8 | 35% | 4.0 | 0.4 | 110 |
| Sunflower Oil Fatty Acid | Sl. Turbid Yellow Liquid | 4 | 35% | 5.9 | 0.7 | 115 |
| Cottonseed Oil Fatty Acid | Sl. Turbid Light Yellow Liquid | 4 | 35% | 4.6 | 0.35 | 94 |
| Soyabean Oil Fatty Acid | Turbid Light Brown Liquid | 6+ | 35% | 5.8 | 0.4 | 141 |
| Corn Oil Fatty Acid | Sl. Turbid Dark Yellow Liquid | 6+ | 35% | 4.9 | 0.7 | 117 |
| Safflower Oil Fatty Acid | Clear Yellow Liquid | 5 | 35% | 10.9 | 0.65 | 255 |
| Coconut Oil | Clear Very Light | 1+ | 35% | 10.9 | 0.5 | 34 |

TABLE I — Continued

| Derivative | Appearance | Color[1] | Solids | Acid No. | Iodine Value | Viscosity[2] in cps. |
|---|---|---|---|---|---|---|
| Fatty Acid | Yellow Liquid | | | | | |
| Mixed Vegetable Oil Fatty Acids | Clear Yellow Liquid | 6 | 35% | 3.6 | 0.1 | 26 |
| Linseed Oil Fatty Acid | Clear Dark Yellow Liquid | 6 | 35% | 10.3 | 0.6 | 193 |

[1] Gardner Scale, 1963
[2] Brookfield Model RVF, 20 rpm, No. 1 spindle at 25°C.

EXAMPLE 3

The foaming agents, disodium fatty acid ethanolamide sulfosuccinate as prepared in Examples 1 and 2, are subjected to a foam height test by means of a graduated cylinder method. This method involves adding to a 100 ml. graduated cylinder 49.9 grams of deionized water and 0.1 gram of the foaming agent, disodium fatty acid ethanolamide sulfosuccinate, then shaking the contents vigorously and permitting the foam to stabilize. The height of each of the foams is set forth in Table II below:

TABLE II

| Derivative | Foam Height (in ml.) |
|---|---|
| Corn Oil Fatty Acid | 57 |
| Safflower Oil Fatty Acid | 53 |
| Mixed Vegetable Oil Fatty Acid | 77 |
| Linseed Oil Fatty Acid | 49 |
| Palm Oil Fatty Acid | 55 |
| Sunflower Oil Fatty Acid | 57 |
| Cottonseed Oil Fatty Acid | 64 |
| Soyabean Oil Fatty Acid | 55 |
| Tall Oil Fatty Acid | 55 |
| Disodium Tallow Amine Sulfosuccinamate (Control) | 20 |

EXAMPLE 4

The products of Examples 1 and 2 are each subjected to a standard foaming test as outlined in ASTM-D1173-53 at pages 183–185. These products are compared with the prior art control compound, disodium tallow amine sulfosuccinamate for foam quantity measured in milliliters. The results of these tests are tabulated in Table II below.

TABLE III

| | Foam Quantity Measured in Millimeters | | | | |
|---|---|---|---|---|---|
| Derivative | Initial | 5 min. | 15 min. | 30 mins. | Foam Quality at 15 min (cc.) |
| Corn Oil Fatty Acid | 295 | 280 | 280 | 275 | 55 dense, 225 light |
| Safflower Oil Fatty Acid | 315 | 310 | 310 | 305 | 60 dense, 250 light |
| Coconut Oil Fatty Acid | 310 | 295 | 295 | 295 | 70 dense, 225 medium |
| Linseed Oil Fatty Acid | 300 | 295 | 290 | 285 | 60 dense, 230 light |
| Palm Oil Fatty Acid | 275 | 265 | 255 | 255 | 50 dense, 205 light |
| Sunflower Oil Fatty Acid | 270 | 255 | 245 | 240 | 50 dense, 195 light |
| Soyabean Oil Fatty Acid | 340 | 315 | 310 | 305 | 50 dense, 260 light |
| Mixed Vegetable Oil Fatty Acid | 305 | 290 | 290 | 285 | 55 dense, 235 light |
| Tall Oil Fatty Acid | 320 | 300 | 295 | 295 | 55 dense, 240 light |
| Disodium Tallow Amine Sulfosuccinamate (control) | 235 | 225 | 215 | 210 | 40 dense, 175 medium |

It is clear from the above foam test data that the products maintain a relatively high foam quantity as compared with well known control foaming agent.

EXAMPLE 5

The foam stability of the products of Examples 1 and 2 is determined by measuring the percent of initial foam obtained in Example 3 and remaining after 30 minutes. The data is tabularized in Table IV below.

TABLE IV

| DERIVATIVE | Foam Retention —% Foam Remaining after 30 Min. (Ross Miles Test) |
|---|---|
| Corn Oil Fatty Acid | 93.5 |
| Safflower Oil Fatty Acid | 94.8 |
| Coconut Oil Fatty Acid | 95.2 |
| Linseed Oil Fatty Acid | 95.0 |
| Palm Oil Fatty Acid | 92.8 |
| Cottonseed Oil Fatty Acid | 92.0 |
| Mixed Vegetable Oil | |

TABLE IV-Continued

| DERIVATIVE | Foam Retention —%<br>Foam Remaining after 30 Min.<br>(Ross Miles Test) |
|---|---|
| Fatty Acid | 93.5 |
| Soyabean Oil Fatty Acid | 93.5 |
| Tall Oil Fatty Acid | 92.2 |
| Disodium Tallow Amine Sulfosuccinamate(Control) | 89.4 |

It is quite unexpected to find the markedly high stability of each of the products of the invention, notwithstanding the relatively high foam quantity, since it is known in the art that a marked decrease in foam stability of such high foamers can occur.

EXAMPLE 6

PREPARATION OF STYRENE-BUTADIENE FOAMED RUBBER

There are admixed 146.0 parts of styrene-butadiene rubber latex (68%), 135 parts of calcium carbonate filler, 25 parts of hydrated alumina, 5.7 parts of disodium tall oil fatty acid ethanolamide sulfosuccinate as prepared in Example 1 above, 1.5 parts of zinc diethyl dithiocarbamate, 10 parts of sodium hexametaphosphate (5% solution), 1 part of zinc methylene bis thiocyanate, 15 parts of water and 12 parts of 2-mercaptobenzothiazole as the vulcanizer. The ingredients are mixed together in the order set forth above and whipped in a Hobart mixer. The mixer whips air into the compounded latex. Resultant foamed latex which has a foam density of 217 gm/liter, is then applied at a rate of 2.49 lb. of foam per square yard to a carpet material as a thin backing layer of about one-quarter inch in thickness. The backing is then given a thirty second infrared lamp treatment to precure it and, finally, curing the latter in an oven maintained at a temperature of 275°F. for 15 minutes.

Employing the diammonium, dipotassium or dilithium salt of tall oil fatty acid ethanolamide sulfosuccinate in lieu of the corresponding disodium salt, and styrene-butadiene carboxylate or polyvinyl chloride in place of styrene-butadiene in the above example, there are attained similar markedly good results.

EXAMPLE 7

USE OF PRIOR ART SURFACTANT, DISODIUM N-TALLOW AMINE SULFOSUCCINAMATE

The process of Example 6 is repeated in every detail except that disodium tallow amine sulfosuccinamate which has a foam density of 234 gm/liter is substituted for the liquid disodium tall oil fatty acid ethanolamide sulfosuccinate. The sulfosuccinamate foamed latex composition is then applied at the rate of 2.69 pounds per square yard of carpet to achieve the same one-quarter inch thickness as attained in Example 6. Consequently, an additional 0.20 pound of foam for each square yard of carpeting is required when utilizing the prior art surfactant.

EXAMPLE 8

Repeating the procedure of Example 6 in every respect except that the compounds of Example 2 are employed in lieu of the disodium salt of tall oil fatty acid ethanolamide sulfosuccinate, the following data are obtained and tabularized in Table V below.

TABLE V

| | Foam Densities and Coverage of SBR Latex Foams Made with Certain Derivatives | |
|---|---|---|
| Derivatives | Foam Density (gm/liter) | Coverage (lb/sq.yd at ¼" thickness) |
| Corn Oil Fatty Acid | 200 | 2.30 |
| Safflower Oil Fatty Acid | 203 | 2.34 |
| Coconut Oil Fatty Acid | 226 | 2.60 |
| Linseed Oil Fatty | 195 | 2.25 |
| Palm Oil Fatty Acid | 219 | 2.52 |
| Mixed Vegetable Oil Fatty Acid | 224 | 2.58 |
| Sunflower Oil Fatty Acid | 205 | 2.36 |
| Soyabean Oil Fatty Acid | 195 | 2.25 |
| Disodium Tallow Amine Sulfosuccinamate (Control) | 234 | 2.69 |

We claim:

1. A foaming composition adapted for use as a coating for carpets which comprises a latex rubber and at least one foaming agent having the formula:

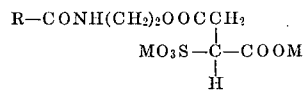

where R is a $C_{12}$–$C_{22}$ fatty acid moiety and M is a cation selected from the group consisting of ammonium, sodium, potassium and lithium.

2. The foaming composition of claim 1 in which the latex rubber is styrene-butadiene latex.

3. The foaming composition of claim 1 in which the latex rubber is polyvinyl chloride latex.

4. The foaming composition of claim 1 in which the latex rubber is styrene-butadiene carboxylated latex.

5. The foaming composition of claim 1 in which the foaming agent is disodium tall oil fatty acid ethanolamide sulfosuccinate.

6. The foaming composition of claim 1 in which the foaming agent is disodium mixed vegetable oil fatty acid ethanolamide sulfosuccinate.

* * * * *